United States Patent [19]

Courtney-Pratt

[11] 3,810,699

[45] May 14, 1974

[54] MEASURING SMALL DISPLACEMENTS

[75] Inventor: Jeofry Stuart Courtney-Pratt, Locust, N.J.

[73] Assignee: Bell Telephone Laboratories, Incorporated, Murray Hill, N.J.

[22] Filed: Dec. 30, 1971

[21] Appl. No.: 214,243

[52] U.S. Cl. ............................................... 356/153
[51] Int. Cl. ................................................ G01b 11/26
[58] Field of Search ........... 356/138, 153, 154, 152; 219/121 L, 121 LM; 331/94.5 A

[56] References Cited
UNITED STATES PATENTS

| 3,542,478 | 11/1970 | Dessus | 331/94.5 A |
| 3,256,524 | 6/1966 | Stauffer | 331/94.5 A |
| 3,265,855 | 8/1966 | Norton | 219/121 LM |
| 3,535,778 | 10/1970 | Falanga et al. | 219/121 LM |
| 3,597,578 | 8/1971 | Sullivan et al. | 219/121 LM |
| 3,383,491 | 5/1968 | Muncheryan | 350/81 |
| 3,463,594 | 8/1969 | Myer | 350/81 |

Primary Examiner—Ronald L. Wibert
Assistant Examiner—Conrad Clark
Attorney, Agent, or Firm—C. E. Graves

[57] ABSTRACT

A modified autocollimator is disclosed which uses the position of a hole placed in a thin opaque film by a reflected laser pulse as a measure of angular displacement of a surface of interest. The hole has a hard, definite edge which can be targeted with greater measurement accuracy than conventional diffraction limited Rayleigh spots.

3 Claims, 3 Drawing Figures

3,810,699

MEASURING SMALL DISPLACEMENTS

FIELD OF THE INVENTION

This inventon relates to improved setting accuracy for optical instruments, precision machine adjustments and the like; and in particular is illustrated by way of an improved autocollimator.

BACKGROUND OF THE INVENTION

Autocollimators are instruments which measure angular displacements, from which straightness, flatness, alignment, angular rotation and small linear displacements can be determined. In a typical autocollimator, a thin beam of light is directed at a reflective surface such as a mirror mounted on a component whose orientation with respect to some reference surface is to be determined. The light reflection returns to an optical system in the autocollimator which typically is a lens of 5 cm. aperture and 100 cm. focal length, corresponding to a numerical aperture of $f/20$. The image of the returning beam produced by this system is focused to what is referred to as a "Rayleigh spot." The position of the Rayleigh spot in the stationary scale of the optical system is a measure of the desired angular displacement, and hence of the straightness, flatness, or other indicia sought.

The Rayleigh spot, however, is inherently diffraction-limited. Conventional practice permits placing the autocollimator microscope cross hairs on the apparent middle of the Rayleigh spot, which typically for an $f/20$ system is about 12 microns in diameter. In this fashion a precision of about 2 microns is realized, which given the usual focal length converts to an angular accuracy of $2/10^6$ radians.

Even this precision, however, is not sufficient for many scientific purpposes; and in any case a greater precision in the accuracy of an autocollimator is generally desirable.

Accordingly, one object of the invention is to improve setting accuracy in optical instruments.

A second inventive object is to measure angular displacements with greater precision, in order to better ascertain measures of straightness, flatness, alignment and the like.

A specific inventive object is to provide a more accurate autocollimator.

Another specific inventive object is to eliminate reliance in conventional autocollimator art upon estimating the position of the center of a Rayleigh spot.

SUMMARY OF THE INVENTION

An improvement in the precision of reading of an autocollimator is achieved pursuant to the invention by placing a thin opaque heat-removable film of, for example, bismuth or the like in the return plane. Then, a sudden flash of light is produced which is reflected from the surface of interest and focused back onto the bismuth film. The light flash has sufficient initial energy to produce a small hole of the order of 1 to 6 microns in diameter in the heat-removable film.

Although the hole thus produced need not be a 1 micron hole in order to realize the benefits of the present invention, these holes can be substantially smaller than the Rayleigh limit. Importantly, in all cases, the hole produced has a hard, clearly discernible edge. Thus, by back-illuminating the burnt bismuth film and by viewing the hole edge with the cross hairs of a compound microscope, it is easy to find the middle of the hole with an accuracy of better than ½ micron.

The viewing optics in the latter case can be a numerical aperture $f/2$ rather than the usual $f/20$. It is seen that the precision of measurement is at least four times better than obtained by working wih the Rayleigh spot.

The invention and its further objects, features and advantages will be more readily apprehended from a reading of a detailed description to follow of an illustrative embodiment in which the invention is embodied in an autocollimator.

DETAILED DESCRIPTION OF ILLUSTRATIVE EMBODIMENT

Figure 1:
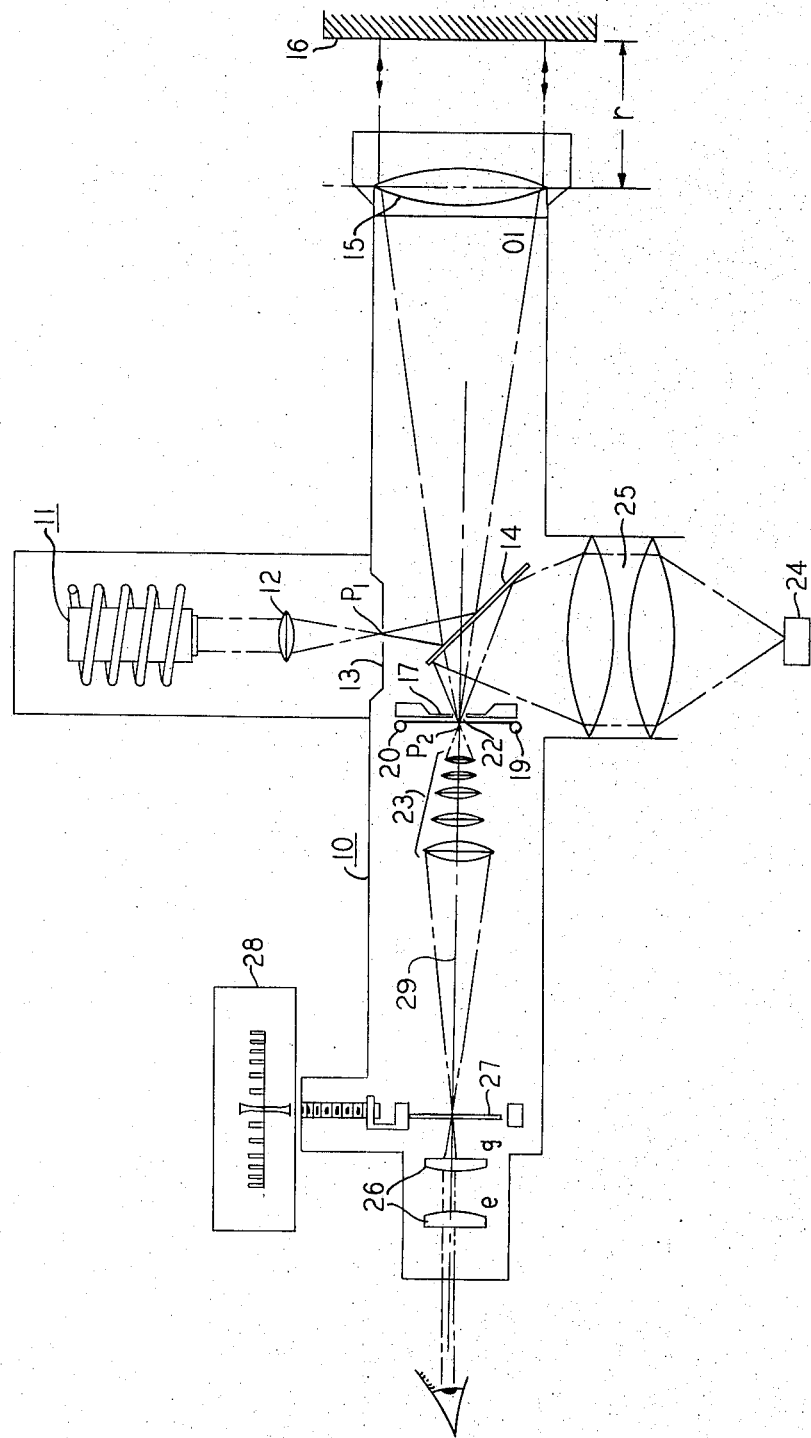
FIG. 1 is a schematic diagram of a modified autocollimator embracing the invention.

An autocollimator, generally designated 10, as in FIG. 1, pursuant to the present invention consists of a laser 11, which is the source of light to be reflected. Laser 11 advantageously is a single mode ruby laser or other pulse laser. The output of laser 11 is directed through lens 12 which focuses the laser pulses to a point designated $p_1$ at the center of an aperture plate 13.

From plate 13 the laser pulse encounters a partially reflecting mirror type beam splitter 14 disposed at a 45 degree angle to the directional path of the pulse. A portion, for example, 50 percent of the laser pulse energy is reflected from splitter 14 to an objective lens 15, from whence it proceeds to the reflective surface 16. The latter typically is a mirror mounted on some surface of interest (not shown) such as a machine bed. The distance denoted $r$ between objective 15 and surface 16 can be a range of from a centimeter or so to several meters.

On reflection from surface 16, the laser pulse travels through the objective 15 and back toward splitter 14. A portion of the energy of the return pulse passes through splitter 14 and is brought to focus at a point $p_2$ in the center of a film holder 17. Disposed in this holder 17 pursuant to the invention, is a film of bismuth 18 (a few hundred angstroms thick) which may, for example, have been coated on a reel of plastic film typically 0.1 mm thick between spindles 19, 20. On encountering the bismuth film, the laser beam evaporates or otherwise removes the bismuth from the plastic substrate film by virtue of its intense heat at the focal point.

Figure 2:
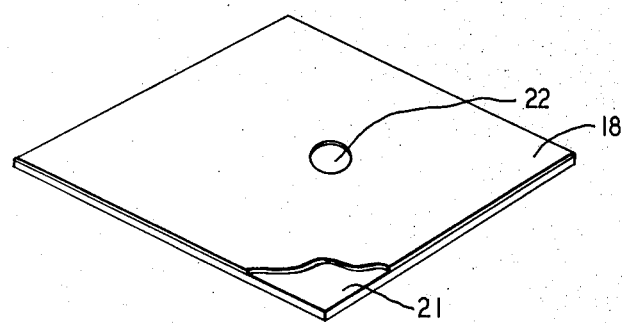
FIG. 2 is a schematic diagram of an element having a heat-removable opaque film.

In one embodiment suggested in FIG. 2, the bismuth-coated film 18 consists of an underlying transparent film 21 of, for example, Mylar which is poly(ethylene terephthalate), or some other transparent material. The film 21 has a thickness of about 0.1 mm, sufficient to provide firm support for the bismuth 18. The bismuth 18 is applied as by evaporation to a coating of approximately 500 or 1,000 angstroms thickness. Other supports besides Mylar include Cronar, cellulose acetate, and glass; and other exemplary suitable opaque heat-removable film materials include Indium, Cadmium, and Nickel phosphide. In general, the film 18 must normally be opaque or nearly so but capable of being rendered transparent, by evaporation by melting and concurrent reticulation or oxidizing of the area directly impinged upon by the laser pulse. For example, the hole such as 22 illustrated in FIG. 2, which as stated above may be 1 to 6 microns in diameter, is the result of a laser pulse of 10 to 15 microns in diameter at the pulse focal point, measured at the half power points.

Figure 3:
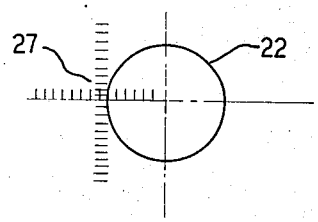
FIG. 3 is a schematic diagram of cross-hair alignment on a hole edge.

The position of hole 22 in film 18 is measured with respect to the stationary detecting optics of autocollimator 10. These include the microscope objective consisting of a lens system 23 having an axis 29 mounted directly behind the film holder 17. Light from a source 24 directed through a condenser lens 25 is reflected from the underside of beam splitter 14 to illuminate the hole 22 from behind. The hole 22 is now viewed through the microscope consisting of objective 23 and eyepiece 26. The position of the hard, clear edge of hole 22 is located by manipulating the cross hairs of measuring graticule 27 to target on a first edge of hole 22 as depicted in FIG. 3. Thereafter, the measuring graticule 27 is positioned by its micrometer dial 28 on the opposite side of the hole 22 to ascertain the hole 22 diameter. In this fashion, or variations thereof, the location of the center of hole 22 is determined. The use to which this information now is put follows from conventional autocollimator practice.

As stated, the hole 22 produced in the bismuth film can be a number of times smaller in diameter than the Rayleigh limit. Since it is a hard-edged hole, the position of that hole can be measured with much greater precision than the position of a luminous line image or the position of an image as recorded on a granular emulsion could be measured. The precision measurement of the bismuth film hole can be even more easily achieved, since a system of wide aperture optics can be used for determining the hole position.

Hole diameters of 1, 2, 4, and 6 microns have been examined using a microscope having an objective of na 0.95. The setting precision on the center or edges of any given hole was found to be of the order of one-fifth of a micron. It is thus seen that a setting precision of about 60 times better than the Rayleigh limit has been achieved. This is some 10 or 12 times better than can customarily be achieved as ordinarily a precision of one-fifth of the Rayleigh limit is all that can be achieved.

It is to be understood that the embodiments described herein are merely illustrative of the principles of the invention. Various modifications may be made thereto by persons skilled in the art without departing from the spirit and scope of the invention.

What is claimed is:

1. Autocollimating apparatus for measuring small angular displacements of a planar reflecting surface with respect to a line that is substantially normal to said surface comprising:

a laser beam;

beam-splitting means disposed substantially at a 45° angle to the path of said laser beam;

an autocollimating objective lens for receiving said laser beam from said beam-splitting means, for directing said beam along an axis coinciding with the optic axis of said objective lens and with said line, and onto said surface, and for directing the reflection of said beam from said surface back through said beam-splitting means and to a focal plane;

normally transparent sheet means with opaquing material disposed thereon mounted in said focal plane;

said means being rendered light-permeable by heat removal of the opaque material by said laser beam, said removal occurring in a generally circular region conforming substantially to a cross section of said beam, and clearly defined by the edge of the opaquing material that is not removed;

microscope means comprising a microscopic objective having an axis that also substantially coincides with said line, for imaging said circular region; and a microscope graticule for receiving said image of said circular region and for measuring distances from said microscopic objective axis of said edges, said distance being a measure of said small angular displacement.

2. Apparatus pursuant to claim 1, further including means for illuminating the side of said sheet material which faces away from said microscope objective.

3. Apparatus pursuant to claim 2, wherein said beam is a pulsed laser and wherein said opaquing material is a thin layer of bismuth metal.

* * * * *